2,868,744
CELLULOSE CONTAINING POLYMERIC MATERIALS AND METHOD OF PRODUCING THE SAME

Howard J. White, Jr., and David M. Cates, Princeton, N. J., assignors to Textile Research Institute, Princeton, N. J., a corporation of New Jersey No Drawing. Application April 7, 1953
Serial No. 347,388

12 Claims. (Cl. 260—17.4)

This invention relates to a new type of product consisting of or comprising an intimate molecular mixture of a hydrophobic polymeric substance and cellulose. The invention is particularly adapted for use in producing new types of fibers and films.

In our copending application Serial No. 345,722, filed March 30, 1953, we have described methods of producing fibers and films wherein acrylonitrile polymers and cellulose derivatives, such as cellulose acetate for example, are combined in intimate molecular mixtures. Products of this type possess many of the desirable properties of each polymer and are of particular value in that they may be dyed with ordinary cellulose acetate dyes using conventional dyeing procedures. The blended polymers also have higher moisture absorption and less static electricity will build up on the material in processing and service than is the case with the pure acrylonitrile polymers.

In accordance with the present invention, blends of hydrophobic polymers and cellulose are produced. Fibers and films of this type are capable of being dyed with the ordinary cellulose dyes and possess higher moisture absorption than the hydrophobic polymers alone. In most instances they have a higher moisture absorption than the acrylonitrile-cellulose derivative blends of our copending application.

Since cellulose itself is relatively insoluble in most solvents and particularly in those solvents capable of dissolving hydrophobic polymers, it is preferable to incorporate the cellulose into the blends of the present invention by hydrolysis or decomposition of a cellulose derivative contained in a previously prepared blend which may be of the type described in our copending application. In this way the cellulose is regenerated from its derivative, in situ within the fiber or film, rendering it unnecessary to use a solvent for the cellulose itself. The methods of the present invention are therefore particularly adapted for use in the treatment of previously produced films, fibers and fabrics to regenerate the cellulose within a manufactured or formed product containing a cellulose derivative and a hydrophobic polymer.

The principal object of the present invention is to provide a new type of fiber or film consisting of or comprising an intimate molecular mixture of cellulose and a hydrophobic polymeric substance.

A specific object of the invention is to provide fibers and films wherein cellulose and an acrylonitrile polymer are present in an intimate molecular mixture.

Another object of the invention is to permit the use of cellulose dyes in dyeing fibers and films containing hydrophobic polymers.

A further object of the invention is to increase the moisture absorbing properties of fibers and films containing acrylonitrile polymers.

Another object of the invention is to provide novel methods for producing intimate molecular mixtures of cellulose and hydrophobic polymeric substances.

These and other objects and features of the present invention will appear from the following description thereof in which typical examples and procedures are cited for the purpose of indicating the nature of the invention but without intending to limit the invention thereto.

The cellulose contained in products of the present invention may be derived from any of the various cellulose esters or other compounds of cellulose which are capable of being hydrolyzed or otherwise converted to regenerate the cellulose in situ within the blend in which the derivative is contained. Typical of such cellulose derivatives are cellulose acetate, cellulose acetate-butyrate, and the like.

The cellulose derivatives may be blended with hydrophobic polymers such as polyacrylonitrile, copolymers of acrylonitrile and vinyl chloride, polyvinyl chloride, and substantially any of the various hydrophobic polymers which are sufficiently soluble in a solvent for the cellulose derivative to produce an intimate molecular mixture therewith.

A typical composition containing a hydrophobic polymer and a cellulose derivative may be produced by dissolving polyacrylonitrile and cellulose acetate in N,N dimethyl formamide in proportions varying from say 95% polyacrylonitrile and 5% of cellulose actate to 5% of polyacrylonitrile and 95% of cellulose acetate. Upon removal of the solvent from such solutions products are obtained in which the cellulose acetate and polyacrylonitrile are present in intimate molecular mixtures. The products may be in the form of films or fibers or may be otherwise shaped or formed.

Upon subjecting such products to controlled hydrolyzing treatment the cellulose derivative is selectively hydrolyzed to regenerate the cellulose in situ. The conditions under which hydrolysis is carried out may be varied greatly and need only be controlled sufficiently to prevent undesired hydrolysis of the hydrophobic polymer. In some instances, a portion only of the cellulose derivative need be hydrolyzed and, in the alternative, a limited amount of the hydrophobic polymer can be hydrolyzed, depending upon the conditions of operation and the properties desired in the finished product. The treated product in any case is an intimate molecular mixture of a hydrophobic polymer and cellulose. It possesses its original form and many of its former physical properties, but is capable of being dyed with cellulose dyes and exhibits a relatively high moisture absorption.

In order to illustrate typical products and procedures in accordance with the present invention, the following examples are cited:

Example I

Four solutions were prepared using N,N dimethyl formamide as a solvent and containing polymers as follows:

| | Percent |
|---|---|
| Polyacrylonitrile | 3.8 |
| Acrylonitrile-vinyl chloride copolymer (Dynel) | 9.8 |
| Commercial cellulose acetate | 3.8 |
| Commercial cellulose acetate | 6.6 |

These solutions were mixed to produce products containing the following polymer concentrations:

Polyacrylonitrile-cellulose acetate:

| | Relative polymer concentrations, wt. percent |
|---|---|
| Polyacrylonitrile | 100 |
| | |
| Polyacrylonitrile | 89 |
| Cellulose acetate | 11 |
| | |
| Polyacrylonitrile | 48 |
| Cellulose acetate | 52 |

| | |
|---|---:|
| Polyacrylonitrile | 9 |
| Cellulose acetate | 91 |
| | |
| Cellulose acetate | 100 |

Dynel-cellulose acetate:

| | |
|---|---:|
| Dynel | 100 |
| | |
| Dynel | 84 |
| Cellulose acetate | 16 |
| | |
| Dynel | 59 |
| Cellulose acetate | 41 |
| | |
| Dynel | 41 |
| Cellulose acetate | 59 |
| | |
| Dynel | 16 |
| Cellulose acetate | 84 |
| | |
| Cellulose acetate | 100 |

Films were cast from each of the above solutions by immersing a glass slide briefly in the solution after which the slide was immersed in water for 10 seconds and then heated in an air oven at 110° C. for a few minutes. The resulting films were easily removed from the slide after the slide had been again immersed in water for several minutes.

*Example II*

The films consisting of mixtures of polyacrylonitrile and cellulose acetate were hydrolyzed to regenerate the cellulose within the films by steeping the films in water for 30 minutes after which they were dried and transferred to flasks to which 25 ml. of methyl alcohol, 10 ml. distilled water and 10 ml. of 0.2 Normal sodium hydroxide were added. The flasks were then placed in a mineral oil bath for 5 minutes, the bath being heated to 50° C. prior to immersion of each flask. The flasks were then allowed to stand for 48 hours at room temperature. The amount of sodium hydroxide consumed in the reaction was then determined by titration with hydrochloric acid. The following results were obtained.

| Polymer Composition of the Solution from which the Film was made, Wt. Percent | | Sample No. | Milliequivalents of base Neutralized per gram of Sample | Apparent Percent Cellulose Acetate in Film Found by Hydrolysis |
|---|---|---|---|---|
| Polyacrylonitrile | 100 | (1) | 0.39 | 4.0 |
| | | (2) | 0.35 | 3.7 |
| Polyacrylonitrile | 89 | (1) | 0.65 | 6.7 |
| Cellulose Acetate | 11 | (2) | 0.66 | 6.8 |
| Polyacrylonitrile | 48 | (1) | 4.34 | 44.9 |
| Cellulose | 52 | (2) | 4.39 | 45.5 |
| Polyacrylonitrile | 9 | (1) | 8.45 | 87.6 |
| Cellulose Acetate | 91 | (2) | 8.62 | 89.4 |
| Cellulose Acetate | 100 | (1) | 9.63 | 100 |
| | | (2) | 9.66 | 100 |

The figures indicate that the hydrolysis of the cellulose acetate content of the films was substantially complete. The apparent cellulose acetate content obtained for the 100% polyacrylonitrile sample is believed to be due to some limited hydrolysis of the polyacrylonitrile and may have been due, in part, to external influences such as carbon dioxide in the atmosphere.

*Example III*

A series of films was produced from the Dynel-cellulose acetate mixtures in the same way. These films were placed in a flask with 2 ml. of 0.1 Normal sodium methylate solution and 80 ml. of absolute alcohol. The flask was warmed on a water bath until the liquid began to boil. Then the flask was removed and allowed to stand at room temperature for 24 hours. Substantially all of the cellulose acetate in the films was thereby converted to cellulose.

*Example IV*

The hydrolyzed films produced in accordance with Examples II and III were subjected to an aqueous stock solution of the cotton direct dye, Pontamine Fast Red 8 BL, conc. 125% (Color Index 278). The concentration of the dye solution was 1 gram of dye per liter and the dyeing in each case was carried out at or near the boiling point of the solution for a period of 1 hour. The films were then removed from the dye solution and washed with water.

Two series of films were tested in each case, one series being unhydrolyzed films and the other series being the hydrolyzed films of Examples II and III. None of the unhydrolyzed films appeared to absorb any of the dye. Furthermore, the films composed of 100% polyacrylonitrile and 100% Dynel absorbed no dye. The hydrolyzed films of both Examples II and III were found, by visual observation, to have absorbed the dye in amounts increasing with the content of cellulose acetate in the original films before hydrolysis.

*Example V*

In order to compare the moisture absorbing characteristics of the hydrolyzed films with those which had not been hydrolyzed, two films, each having an original content of 55% polyacrylonitrile and 45% cellulose acetate, were prepared. One film was hydrolyzed as described in Example II and the other was not treated. Both films were dried for 4 hours at a temperature of 110° C. and thereafter allowed to condition for 48 hours at 65% relative humidity and 70° F. The moisture regain of the hydrolyzed film was 5.8%, whereas the moisture regain of the unhydrolyzed film was only 0.4%.

*Example VI*

Films produced by hydrolyzing the Dynel-cellulose acetate products were dried in an air oven for 5 hours at 110° C. and thereafter were conditioned for 12 hours at 65% relative humidity at 70° F. with the following results:

| Unhydrolyzed Composition | | Moisture Regain | |
|---|---|---|---|
| Dynel | Cellulose Acetate | Unhydrolyzed Film | Hydrolyzed Film |
| | | *Percent* | *Percent* |
| 100 | 0 | 0.0 | 3.0 |
| 84 | 16 | 0.0 | 5.4 |
| 59 | 41 | 1.3 | 9.8 |
| 41 | 59 | 1.0 | 10.0 |

The presence of regenerated cellulose in the hydrolyzed films is clearly indicated by the ability of the films to be dyed with a cellulose dye that is not capable of dyeing cellulose acetate or the hydrophobic polymer.

The possibility of using conventional cellulose dyes and conventional dyeing procedures on films, fibers and fabrics containing such highly hydrophobic polymers as the acrylonitrile polymers offers important commercial advantages and renders it possible to simplify dyeing procedures while retaining the intrinsic advantages of hydrophobic materials. The amount of the cellulose contained in fibers or films produced in accordance with the present invention may, of course, be varied considerably. It is therefore possible to produce a whole range of new fibers and films varying in their composition and physical properties from pure hydrophobic polymers to pure cellulose. The products of the present invention are, of course, blends of cellulose and hydrophobic polymers in which the cellulose and polymer are intimate molecular mixtures. Ordinarily, products of the present invention will contain from about 95% of hydrophobic polymer and 5% of cellulose to 5% of hydrophobic polymer and 95% of cellulose.

While various compositions and methods of procedure for producing the same have been described above, it will be apparent that the invention is capable of many modifications and changes. It should, therefore, be understood that the particular methods and compositions described are intended to be illustrative only and are not intended to limit the scope of the invention.

We claim:

1. A product comprising an intimate mixture of an in situ hydrolyzed cellulose ester and a substantially unhydrolyzed hydrophobic fiber and film forming polymer selected from the group consisting of acrylonitrile polymers and vinyl chloride polymers.

2. A product comprising an intimate mixture of an in situ hydrolyzed cellulose ester and a substantially unhydrolyzed hydrophobic fiber and film forming acrylonitrile polymer.

3. A product comprising an intimate mixture of an in situ hydrolyzed cellulose ester and a substantially unhydrolyzed hydrophobic fiber and film forming vinyl chloride polymer.

4. A product comprising an intimate mixture of an in situ hydrolyzed cellulose ester and a substantially unhydrolyzed hydrophobic fiber and film forming copolymer of acrylonitrile and vinyl chloride.

5. A product comprising an intimate mixture of from about 5 to 95% of cellulose and from about 95 to 5% of a substantially unhydrolyzed hydrophobic fiber and film forming polymer selected from the group consisting of acrylonitrile polymers and vinyl chloride polymers, the cellulose being the product resulting from hydrolysis of a cellulose compound in situ in the mixture.

6. A product comprising an intimate mixture of from about 5 to 95% of cellulose and from about 95 to 5% of substantially unhydrolyzed polyacrylonitrile, the cellulose being the product resulting from hydrolysis of a cellulose compound in situ in the mixture.

7. A product comprising an intimate mixture of from about 5 to 95% of cellulose and from about 95 to 5% of substantially unhydrolyzed polyvinyl chloride, the cellulose being the product resulting from hydrolysis of a cellulose compound in situ in the mixture.

8. A product comprising an intimate mixture of from about 5 to 95% of cellulose and from about 95 to 5% of a substantialy unhydrolyzed copolymer of acrylonitrile and vinyl chloride, the cellulose being the product resulting from hydrolysis of a cellulose compound in situ in the mixture.

9. A method which comprises the steps of dissolving in a solvent medium from about 5 to 95% of a hydrophobic fiber and film forming polymer selected from the group consisting of acrylonitrile polymers and vinyl chloride polymers, and from about 95 to 5% of a cellulose ester which is more readily hydrolyzed than said polymer, removing solvent therefrom and selectively hydrolyzing the resulting product under conditions which serve to regenerate the cellulose without substantial hydrolysis of the remainder of the composition.

10. A method which comprises the steps of dissolving from about 5 to 95% of polyacrylonitrile and from about 95 to 5% of cellulose acetate in a common solvent medium, shaping the resulting solution, removing the solvent therefrom and selectively hydrolyzing the cellulose acetate without substantially hydrolyzing the polyacrylonitrile in the resulting product.

11. A method which comprises the steps of dissolving from about 5 to 95% of polyvinyl chloride and from about 95 to 5% of cellulose acetate in a common solvent medium, shaping the resulting solution, removing the solvent therefrom and selectively hydrolyzing the cellulose aetate without substantially hydrolyzing the polyvinyl chloride in the resulting product.

12. A method which comprises the steps of dissolving from about 5 to 95% of a copolymer of acrylonitrile and vinyl chloride and from about 95 to 5% of cellulose acetate in a common solvent medium, shaping the resulting solution, removing the solvent therefrom and selectively hydrolyzing the cellulose acetate without substantially hydrolyzing the copolymer of acrylonitrile and vinyl chloride in the resulting product.

References Cited in the file of this patent

UNITED STATES PATENTS

| 1,365,891 | Carter | Jan. 18, 1921 |
| 2,140,048 | Fikentscher | Dec. 13, 1938 |
| 2,334,358 | Smith | Nov. 16, 1943 |
| 2,347,525 | Thinius | Apr. 25, 1944 |
| 2,404,714 | Latham | July 23, 1946 |
| 2,512,629 | Fisher | June 27, 1950 |